United States Patent
Yoon et al.

(10) Patent No.: US 10,003,785 B2
(45) Date of Patent: Jun. 19, 2018

(54) METHOD AND APPARATUS FOR GENERATING IMAGES

(71) Applicant: Samsung Electronics Co., Ltd., Gyeonggi-do (KR)

(72) Inventors: Young-Kwon Yoon, Seoul (KR); Taek-Seong Jeong, Gyeonggi-do (KR); Moon-Soo Kim, Seoul (KR); Tae-Ho Kim, Chungcheongbuk-do (KR); Ki-Huk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 336 days.

(21) Appl. No.: 14/732,904

(22) Filed: Jun. 8, 2015

(65) Prior Publication Data
US 2015/0356738 A1 Dec. 10, 2015

(30) Foreign Application Priority Data
Jun. 9, 2014 (KR) ........................ 10-2014-0069443

(51) Int. Cl.
| | | |
|---|---|---|
| G06T 7/00 | (2017.01) | |
| H04N 13/02 | (2006.01) | |
| H04N 5/222 | (2006.01) | |
| H04N 5/225 | (2006.01) | |
| H04N 5/232 | (2006.01) | |
| G06T 5/50 | (2006.01) | |
| H04N 101/00 | (2006.01) | |
| H04N 13/00 | (2018.01) | |

(52) U.S. Cl.
CPC .......... *H04N 13/0253* (2013.01); *G06T 5/50* (2013.01); *H04N 5/2226* (2013.01); *H04N 5/2258* (2013.01); *H04N 5/23216* (2013.01); *H04N 5/23293* (2013.01); *H04N 13/0239* (2013.01); *H04N 13/0242* (2013.01); *H04N 13/0271* (2013.01); *G06T 2207/10028* (2013.01); *G06T 2207/20221* (2013.01); *H04N 2013/0081* (2013.01); *H04N 2013/0088* (2013.01); *H04N 2101/00* (2013.01)

(58) Field of Classification Search
CPC .......... H04N 13/0239; H04N 13/0253; H04N 2101/00; H04N 13/02; G06T 5/50; G06T 2207/10028; G06T 7/00; G06T 5/00; G06T 1/00
See application file for complete search history.

(56) References Cited

U.S. PATENT DOCUMENTS

| | | | | |
|---|---|---|---|---|
| 7,102,686 | B1 * | 9/2006 | Orimoto | G03B 35/08 348/231.7 |
| 2009/0027487 | A1 * | 1/2009 | Misawa | H04N 13/0003 348/51 |

FOREIGN PATENT DOCUMENTS

KR 10-2014-0029755 A 3/2014

* cited by examiner

*Primary Examiner* — David N Werner
*Assistant Examiner* — Berteau Joisil
(74) *Attorney, Agent, or Firm* — Cha & Reiter, LLC

(57) ABSTRACT

A method is provided including: acquiring a plurality of images; obtaining depth information associated with at least two subjects in each of the plurality of images; and generating a final image having the subjects based on the depth information.

20 Claims, 16 Drawing Sheets

METHOD AND APPARATUS FOR GENERATING IMAGES

CLAIM OF PRIORITY

This application claims the priority under 35 U.S.C. § 119(a) to Korean Application Serial No. 10-2014-0069443, which was filed in the Korean Intellectual Property Office on Jun. 9, 2014, the entire content of which is hereby incorporated by reference.

BACKGROUND

1. Field of the Invention

The present disclosure is related to electronic devices, and more particularly to a method and apparatus for generating images.

2. Description of the Related Art

With the development of the electronic device, a camera function has been improved, and thus a user can capture a desired image with a high definition. In addition thereto, the electronic device utilizes depth information depending on a distance between the electronic device and subjects, thereby improving user convenience.

For example, the electronic device can collect a plurality of images by using an array camera included in the electronic device, and thus can acquire information depending on a depth of each subject.

According to the existing technique, depth information of various subjects is extracted by using a plurality of camera modules included in the electronic device. However, when the depth information of the subjects is extracted in the electronic device, an image is processed by extracting the depth information more than necessary, which results in an increase in an amount of image processing in practice.

SUMMARY

According to aspects of the disclosure, a method is provided comprising: acquiring a plurality of images; obtaining depth information associated with at least two subjects in each of the plurality of images; and generating a final image having the subjects based on the depth information.

According to aspects of the disclosure, an electronic device is provided comprising a plurality of image sensors and a processor configured to: acquire a plurality of images; obtain depth information with at least two subjects in each of the plurality of images; and generating a final image having the subjects based on the depth information.

BRIEF DESCRIPTION OF THE DRAWINGS

The above and other aspects, features and advantages of certain exemplary embodiments of the present disclosure will be more apparent from the following detailed description taken in conjunction with the accompanying drawings, in which.

DETAILED DESCRIPTION

Figure 1:
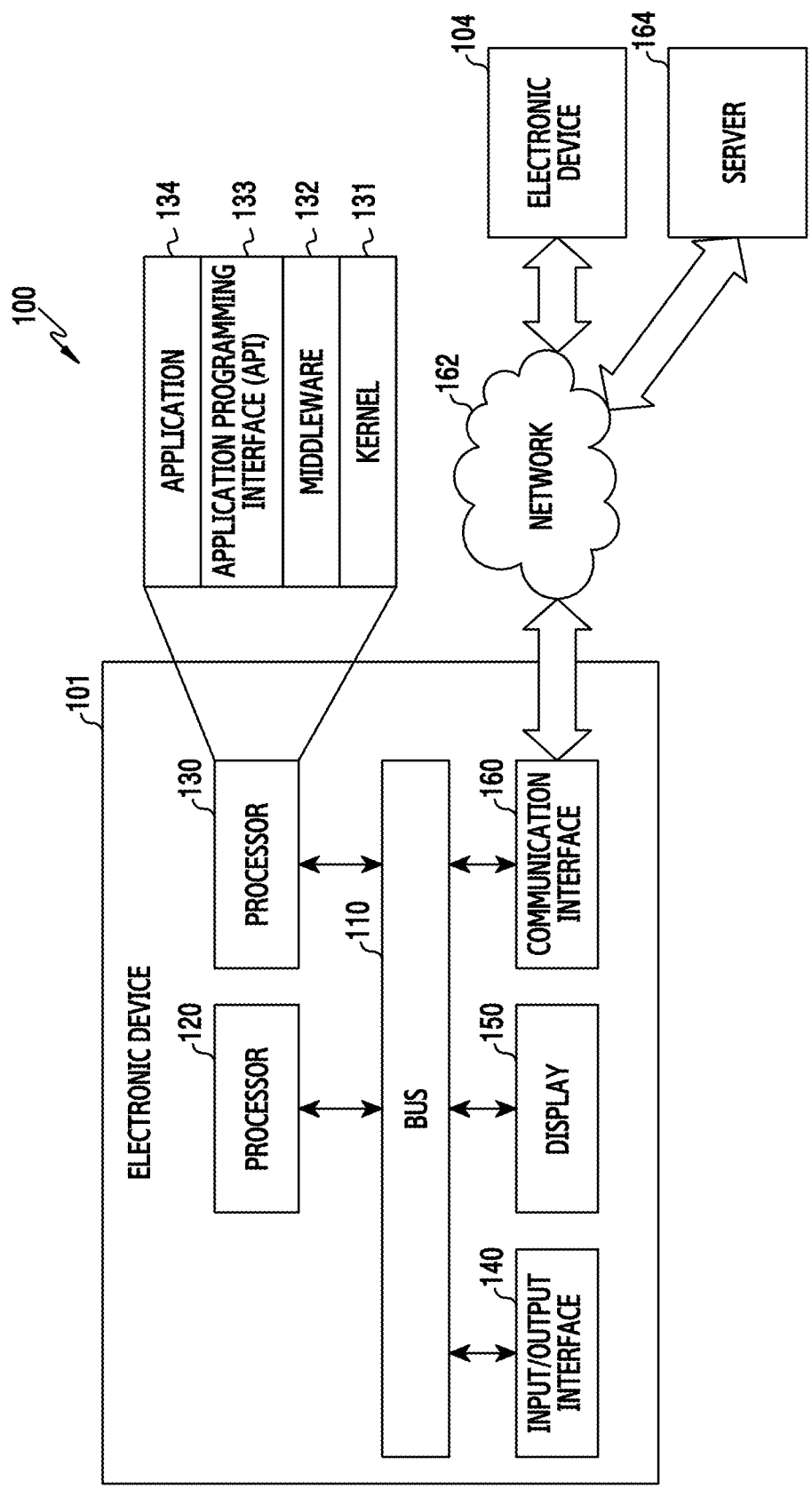
FIG. 1 is a diagram of an example of a network environment, according to aspects of the disclosure.

Hereinafter, aspects of the disclosure are described with reference to the accompanying drawings. While the aspects of the disclosure are susceptible to various modifications and alternative forms, a specific embodiment thereof has been shown by way of example in the drawings and will herein be described in detail. It should be understood, however, that it is not intended to limit the aspects of the disclosure to the particular form disclosed, but on the contrary, the aspects of the disclosure are to cover all modifications, equivalent, and alternatives falling within the spirit and scope of the aspects of the disclosure as defined by the appended claims. Like reference numerals denote like constitutional elements throughout the drawings.

The expression "include" or "may include" used in the aspects of the disclosure is intended to indicate a presence of a corresponding function, operation, or constitutional element disclosed herein, and it is not intended to limit a presence of one or more functions, operations, or constitutional elements. In addition, in the aspects of the disclosure, the term "include" or "have" is intended to indicate that characteristics, numbers, steps, operations, constitutional elements, and elements disclosed in the specification or combinations thereof exist. As such, the term "include" or "have" should be understood that there are additional possibilities of one or more other characteristics, numbers, steps, operations, constitutional elements, elements or combinations thereof.

In aspects of the disclosure, an expression "or" includes any and all combinations of words enumerated together. For example, "A or B" may include A or B, or may include both of A and B.

Although expressions used in aspects of the disclosure such as "1$^{st}$", "2$^{nd}$", "first", "second" may be used to express various constitutional elements of the disclosed subject matter, they are not intended to limit the corresponding constitutional elements. For example, the above expressions are not intended to limit an order or an importance of the corresponding constitutional elements. The above expressions may be used to distinguish one constitutional element from another constitutional element. For example, a 1$^{st}$ user device and the 2$^{nd}$ user device are both user devices, and indicate different user devices. For example, a 1$^{st}$ constitutional element may be termed a 2$^{nd}$ constitutional element, and similarly, the 2$^{nd}$ constitutional element may be termed the 1$^{st}$ constitutional element without departing from the scope of the aspects of the disclosure.

When a constitutional element is mentioned as being "connected" to or "accessing" another constitutional element, this may mean that it is directly connected to or accessing the other constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

The terminology used in the disclosure is for the purpose of providing examples only and is not intended to be limiting in any way. A singular expression includes a plural expression unless there is a contextually distinctive difference therebetween. Unless otherwise defined, all terms (including technical and scientific terms) used herein have the same meaning as commonly understood by those ordinarily skilled in the art. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

An electronic device according to aspects of the disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MPEG-1 Audio Layer 3 (MP3) player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, or a smart watch).

According to aspects of the disclosure, the electronic device may be a smart white appliance having a communication function. For example, the smart white appliance may include at least one of a TeleVision (TV), a Digital Video Disk (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, and an electronic picture frame.

According to aspects of the disclosure, the electronic device may include at least one of various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, and Point Of Sales (POS) of shops.

According to aspects of the disclosure, the electronic device may include at least one of a furniture or a part of building/constructions including a communication function, an electronic board, an electronic signature input device, a projector, and various measurement machines (e.g., water supply, electricity, gas, propagation measurement machine, etc.). The electronic device according to aspects of the disclosure may be one or more combinations of the aforementioned various devices. In addition, the electronic device according to aspects of the disclosure may be a flexible device. In addition, it is apparent those ordinarily skilled in the art that the electronic device need not be limited to the aforementioned devices.

Hereinafter, an electronic device according to aspects of the disclosure will be described with reference to the accompanying drawings. The term 'user' as used throughout the disclosure may refer to a person who uses the electronic device or a device which uses the electronic device (e.g., an Artificial Intelligence (AI) electronic device).

FIG. 1 is a diagram of an example of a network environment 100 including an electronic device 101, according to aspects of the disclosure. Referring to FIG. 1, the electronic device 101 may include a bus 110, a processor 120, a memory 130, an input/output interface 140, a display 150, and a communication interface 160.

The bus 110 may be a circuit for connecting the aforementioned constitutional elements to each other and for delivering communication (e.g., a control message) between the aforementioned constitutional elements.

The processor 120 may include any suitable type of processing circuitry. For example, the processor 120 may include one or more of a general-purpose processor (e.g., an ARM-based processor), a Field-Programmable Gate Array (FPGA), an Application-Specific Integrated Circuity (ASIC), or a Digital Signal Processor (DSP). In operation, the processor 120 may receive an instruction from the aforementioned different constitutional elements (e.g., the memory 130, the input/output interface 140, the display 150, the communication interface 160, etc.), for example, via the bus 110, and thus may interpret the received instruction and execute arithmetic or data processing according to the interpreted instruction.

The memory 130 may store an instruction or data received from the processor 120 or different constitutional elements (e.g., the input/output interface 140, the display 150, the communication interface 160, etc.) or generated by the processor 120 or the different constitutional elements. The memory 130 may include programming modules such as a kernel 131, a middleware 132, an Application Programming Interface (API) 133, an application 134, and the like. Each of the aforementioned programming modules may consist of software, firmware, or hardware entities or may consist of at least two or more combinations thereof.

The kernel 131 may control or manage the remaining other programming modules, for example, system resources (e.g., the bus 110, the processor 120, the memory 130, etc.) used to execute an operation or function implemented in the middleware 132, the API 133, or the application 134. In addition, the kernel 131 may provide a controllable or manageable interface by accessing individual constitutional elements of the electronic device 101 in the middleware 132, the API 133, or the application 134.

The middleware 132 may perform a mediation role so that the API 133 or the application 134 communicates with the kernel 131 to exchange data. In addition, regarding task requests received from the application 134, for example, the middleware 132 may perform a control (e.g., scheduling or load balancing) for the task requests by using a method of assigning a priority capable of using a system resource (e.g., the bus 110, the processor 120, the memory 130, etc.) of the electronic device 101 to at least one of the applications 134.

The API 133 may include at least one interface or function (e.g., instruction) for file control, window control, video processing, character control, and the like, as an interface capable of controlling a function provided by the application 134 in the kernel 131 or the middleware 132.

According to aspects of the disclosure, the application 134 may include an Short Message Service (SMS)/Multimedia Messaging Service (MMS) application, an e-mail application, a calendar application, an alarm application, a health care application (e.g., an application for measuring a physical activity level, a blood sugar, etc.) or an environment information application (e.g., atmospheric pressure, humidity, or temperature information). Additionally or alternatively, the application 134 may be an application related to an information exchange between the electronic device 101 and an external electronic device (e.g., an electronic device 104). The application related to the information exchange may include, for example, a notification relay application for relaying specific information to the external electronic device or a device management application for managing the external electronic device.

For example, the notification relay application may include a function of relaying notification information generated in another application (e.g., an SMS/MMS application, an e-mail application, a health care application, an environment information application, etc.) of the electronic device 101 to the external electronic device (e.g., the electronic device 104). Additionally or alternatively, the notification relay application may receive notification information, for example, from the external electronic device (e.g., the electronic device 104) and may provide it to the user. The device management application may manage, for example, a function for at least one part of the external electronic device (e.g., the electronic device 104) which communicates with the electronic device 101. Examples of the function include turning on/turning off the external electronic device itself (or some components thereof) or adjusting of a display illumination (or a resolution), and managing (e.g., installing, deleting, or updating) an application which operates in the external electronic device or a service (e.g., a call service or a message service) provided by the external electronic device.

According to aspects of the disclosure, the application 134 may include an application specified according to attribute information (e.g., an electronic device type) of the external electronic device (e.g., the electronic device 104). For example, if the external electronic device is an MP3 player, the application 134 may include an application related to a music play. Similarly, if the external electronic device is a mobile medical device, the application 134 may include an application related to health care. According to aspects of the disclosure, the application 134 may include at least one of a specified application in the electronic device 101 or an application received from the external electronic device (e.g., a server 164 or the electronic device 104).

The input/output interface 140 may relay an instruction or data input from a user by using a sensor (e.g., an acceleration sensor, a gyro sensor) or an input device (e.g., a keyboard or a touch screen) to the processor 120, the memory 130, or the communication interface 160, for example, via the bus 110. For example, the input/output interface 140 may provide data regarding a user's touch input via the touch screen to the processor 120. In addition, the input/output interface 140 may output an instruction or data received from the processor 120, the memory 130, or the communication interface 160 to an output device (e.g., a speaker or a display), for example, via the bus 110. For example, the input/output interface 140 may output audio data provided by using the processor 120 to the user via the speaker.

The display 150 may display a variety of information (e.g., multimedia data or text data) to the user.

The communication interface 160 may connect a communication between the electronic device 101 and an external device (e.g., the electronic device 104 or the server 164). For example, the communication interface 160 may communicate with the external device by being connected to a network 162 through wireless communication or wired communication. The wireless communication may include, for example, at least one of Wireless Fidelity (Wi-Fi), Bluetooth (BT), Near Field Communication (NFC), Global Positioning System (GPS), and cellular communication (e.g., LTE, LTE-A, CDMA, WCDMA, UMTS, WiBro, GSM, etc.). The wired communication may include, for example, at least one of Universal Serial Bus (USB), High Definition Multimedia Interface (HDMI), Recommended Standard (RS)-232, and Plain Old Telephone Service (POTS).

According to aspects of the disclosure, the network 162 may be a telecommunications network. The telecommunications network may include at least one of a computer network, an internet, an internet of things, and a telephone network. According to aspects of the disclosure, a protocol (e.g., a transport layer protocol, a data link layer protocol, or a physical layer protocol) for communication between the electronic device 101 and an external device may be supported in at least one of the application 134, the application programming interface 133, the middleware 132, the kernel 131, and the communication interface 160.

Figure 2:
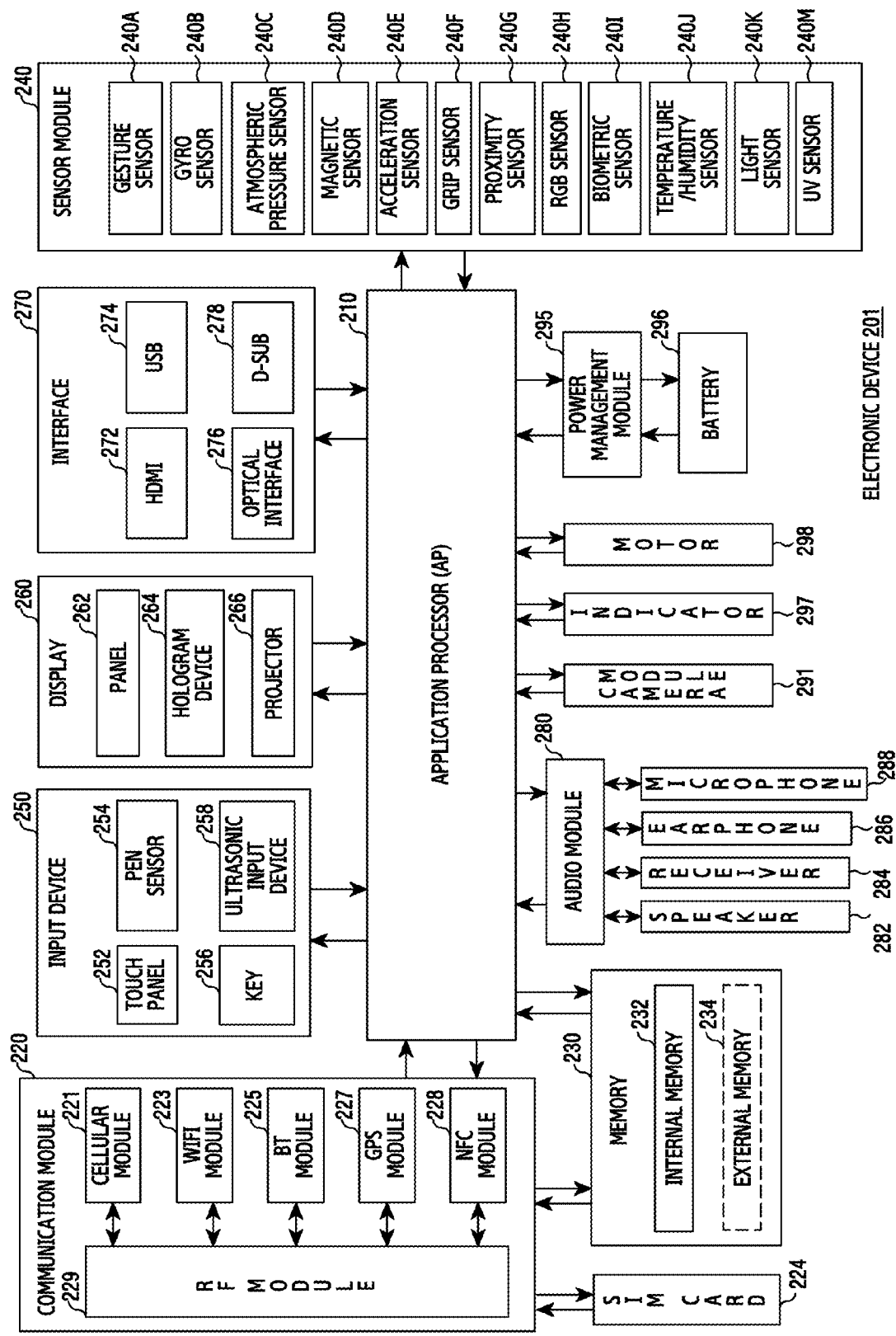
FIG. 2 is a block diagram of an example of an electronic device, according to aspects of the disclosure.

FIG. 2 is a block diagram of an example of an electronic device 201, according to aspects of the disclosure. The electronic device 201 may be, for example, the electronic device 101 of FIG. 1. Referring to FIG. 2, the electronic device 201 includes at least one Application Processor (AP) 210, a communication module 220, a Subscriber Identification Module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may control a plurality of hardware or software constitutional elements connected to the AP 210 by driving an operating system or an application program, and may process a variety of data including multimedia data and may perform an arithmetic operation. The AP 210 may be implemented, for example, with a System on Chip (SoC). According to aspects of the disclosure, the AP 210 may further include a Graphic Processing Unit (GPU).

The communication module 220 (e.g., the communication interface 160) may perform data transmission/reception in communication between other electronic devices (e.g., the electronic device 104 or the server 164) connected with the electronic device 201 (e.g., the electronic device 101) through a network. According to one exemplary embodiment, the communication module 220 may include a cellular module 221, a Wi-Fi module 223, a BlueTooth (BT) module 225, a Global Positioning System (GPS) module 227, a Near Field Communication (NFC) module 228, and a Radio Frequency (RF) module 229.

The cellular module 221 may provide a voice call, a video call, a text service, an internet service, and the like through a communication network (e.g., LTE, LTE-A, CDMA, WCDMA, UMTS, WiBro, GSM, etc.). In addition, the cellular module 221 may identify and authenticate the electronic device within the communication network by using a subscriber identity module (e.g., the SIM card 224). According to aspects of the disclosure, the cellular module 221 may perform at least some of functions that can be provided by the AP 210. For example, the cellular module 221 may perform at least some of multimedia control functions.

According to aspects of the disclosure, the cellular module 221 may include a Communication Processor (CP). Further, the cellular module 221 may be implemented, for example, with a SoC. Although constitutional elements such as the cellular module 221 (e.g., the communication processor), the memory 230, the power management module 295, and the like are illustrated as separate constitutional elements with respect to the AP 210 in FIG. 2, the AP 210 may also be implemented such that at least one part (e.g., the cellular module 221) of the aforementioned constitutional elements is included.

According to aspects of the disclosure, the AP 210 or the cellular module 221 (e.g., the communication processor) may load an instruction or data, which is received from each non-volatile memory connected thereto or at least one of different constitutional elements, to a volatile memory and may process the instruction or data. In addition, the AP 210 or the cellular module 221 may store data, which is received from at least one of different constitutional elements or generated by at least one of different constitutional elements, into the non-volatile memory.

Each of the WiFi module 223, the BT module 225, the GPS module 227, and the NFC module 228 may include, for example, a processor for processing data transmitted/received through a corresponding module. Although the cellular module 221, the WiFi module 223, the BT module 225, the GPS module 227, and the NFC module 228 are illustrated in FIG. 2 as separate blocks, according to aspects of the disclosure, at least some (e.g., two or more) of the cellular module 221, the WiFi module 223, the BT module 225, the GPS module 227, and the NFC module 228 may be included in one Integrated Chip (IC) or IC package. For example, at least some of processors corresponding to the cellular module 221, the WiFi module 223, the BT module 225, the GPS module 227, and the NFC module 228 (e.g., a communication processor corresponding to the cellular module 221 and a WiFi processor corresponding to the WiFi module 223) may be implemented with an SoC.

The RF module 229 may serve to transmit/receive data, for example, to transmit/receive an RF signal. Although not shown, the RF module 229 may include, for example, a transceiver, a Power Amp Module (PAM), a frequency filter, a Low Noise Amplifier (LNA), and the like. In addition, the RF module 229 may further include a component for transmitting/receiving a radio wave on a free space in wireless communication, for example, a conductor, a conducting wire, and the like. Although it is illustrated in FIG. 2 that the cellular module 221, the WiFi module 223, the BT module 225, the GPS module 227, and the NFC module 228 share one RF module 229, according to aspects of the disclosure, at least one of the cellular module 221, the WiFi module 223, the BT module 225, the GPS module 227, the NFC module 228 may transmit/receive an RF signal via a separate RF module.

The SIM card 224 may be a card in which a SIM is implemented, and may be inserted in a slot formed at a specific location of the electronic device. The SIM card 224 may include unique identification information (e.g., an Integrated Circuit Card IDentifier (ICCID)) or subscriber information (e.g., an International Mobile Subscriber Identity (IMSI)).

The memory 230 (e.g., the memory 130) may include an internal memory 232 or an external memory 234. The internal memory 232 may include, for example, at least one of a volatile memory (e.g., a Dynamic RAM (DRAM), a Static RAM (SRAM), a Synchronous Dynamic RAM (SDRAM), etc.) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.).

According to aspects of the disclosure, the internal memory 232 may be a Solid State Drive (SSD). The external memory 234 may further include a flash drive, and may further include, for example, Compact Flash (CF), Secure Digital (SD), Micro Secure Digital (Micro-SD), Mini Secure digital (Mini-SD), extreme Digital (xD), memory stick, and the like. The external memory 234 may be operatively coupled to the electronic device 201 via various interfaces. According to aspects of the disclosure, the electronic device 201 may further include a storage unit (or a storage medium) such as a hard drive.

The sensor module 240 may measure a physical quantity or detect an operation state of the electronic device 201, and thus may convert the measured or detected information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternatively, the sensor module 240 may include, for example, an E-node sensor (not shown), an ElectroMyoGraphy (EMG) sensor (not shown), an ElectroEncephaloGram (EEG) sensor (not shown), an ElectroCardioGram (ECG) sensor (not shown), a fingerprint sensor, etc. The sensor module 240 may further include a control circuit for controlling at least one or more sensors included therein.

The input module 250 may include a touch panel 252, a (digital) pen sensor 254, a key 256, or an ultrasonic input unit 258. The touch panel 252 may recognize a touch input, for example, by using at least one of an electrostatic type, a pressure-sensitive type, and an ultrasonic type. The touch panel 252 may further include a control circuit. In case of the electrostatic type, not only a physical contact but also a proximity recognition is also possible. The touch penal 252 may further include a tactile layer. In this case, the touch panel 252 may provide the user with a tactile reaction.

The (digital) pen sensor 254 may be implemented, for example, by using the same or similar method of receiving a touch input of the user or by using an additional sheet for recognition. The key 256 may be, for example, a physical button, an optical key, a keypad, or a touch key. The ultrasonic input unit 258 is a device by which the electronic device 201 detects a sound wave through a microphone (e.g., a microphone 288) by using a pen which generates an ultrasonic signal, and is a device capable of radio recognition. According to aspects of the disclosure, the electronic device 201 may use the communication module 220 to receive a user input from an external device (e.g., a network, a computer, or a server) connected thereto.

The display 260 (e.g., the display 150) may include a panel 262, a hologram 264, or a projector 266. The panel 262 may be, for example, a Liquid-Crystal Display (LCD), an Active-Matrix Organic Light-Emitting Diode (AM-OLED), etc. The panel 262 may be implemented, for example, in a flexible, transparent, or wearable manner. The panel 262 may be constructed as one module with the touch panel 252. The hologram 264 may use an interference of light and show a stereoscopic image in the air. The projector 266 may display an image by projecting a light beam onto a screen. The screen may be located, for example, inside or outside the electronic device 201. According to aspects of the disclosure, the display 260 may further include a control circuit for controlling the panel 262, the hologram 264, or the projector 266.

The interface 270 may include, for example, a High-Definition Multimedia Interface (HDMI) 272, a Universal Serial Bus (USB) 274, an optical communication interface 276, or a D-subminiature (D-sub) 278. The interface 270 may be included, for example, in the communication interface 160 of FIG. 1. Additionally or alternatively, the interface 270 may include, for example, Mobile High-definition Link (MHL) (not shown), Secure Digital (SD)/Multi-Media Card (MMC) (not shown) or Infrared Data Association (IrDA) (not shown).

The audio module 280 may bilaterally convert a sound and electric signal. At least some constitutional elements of the audio module 208 may be included in, for example, the input/output interface 140 of FIG. 1. The audio module 280 may convert sound information which is input or output, for example, through a speaker 282, a receiver 284, an earphone 286, the microphone 288, and the like.

The camera module 291 is a device for image and video capturing, and it may include one or more image sensors (e.g., a front sensor or a rear sensor), a lens (not shown), an Image Signal Processor (ISP) (not shown), or a flash (not shown, e.g., LED or xenon lamp).

The power management module 295 may manage power of the electronic device 201. Although not shown, the power management module 295 may include, for example, a Power Management Integrated Circuit (PMIC), a charger Integrated Circuit (IC), or a battery fuel gauge.

The PMIC may be placed, for example, inside an IC or SoC semiconductor. Charging may be classified into wired charging and wireless charging. The charger IC may charge a battery, and may avoid an over-voltage or over-current flow from a charger. According to aspects of the disclosure, the charger IC may further include a charger IC for at least one of the wired charging and the wireless charging. The wireless charging may be classified, for example, into a magnetic resonance type, a magnetic induction type, and an electromagnetic type. An additional circuit for the wireless charging, for example, a coil loop, a resonant circuit, a rectifier, and the like, may be added.

The battery gauge may measure, for example, a residual quantity of the battery 296 and a voltage, current, and temperature during charging. The battery 296 may store or generate electricity, and may supply power to the electronic device 201 by using the stored or generated electricity. For example, the battery 296 may include a rechargeable battery or a solar battery.

The indicator 297 may indicate a specific state, for example, a booting state, a message state, a charging state, and the like, of the electronic device 201 or a part thereof (e.g., the AP 210). The motor 298 may convert an electric signal into a mechanical vibration. Although not shown, the electronic device 201 may include a processing unit (e.g., a GPU) for supporting mobile TV. The processing unit for supporting mobile TV may process media data according to a protocol of, for example, Digital Multimedia Broadcasting (DMB), Digital Video Broadcasting (DVB), media flow, and the like.

Each of the aforementioned constitutional elements of the electronic device according to aspects of the disclosure may consist of one or more components, and names thereof may vary depending on a type of electronic device. The electronic device according to aspects of the disclosure may include at least one of the aforementioned constitutional elements. Some of the constitutional elements may be omitted, or additional other constitutional elements may be further included. In addition, some of the constitutional elements of the electronic device according to aspects of the disclosure may be combined and constructed as one entity, so as to equally perform functions of corresponding constitutional elements before combination.

Figure 3:
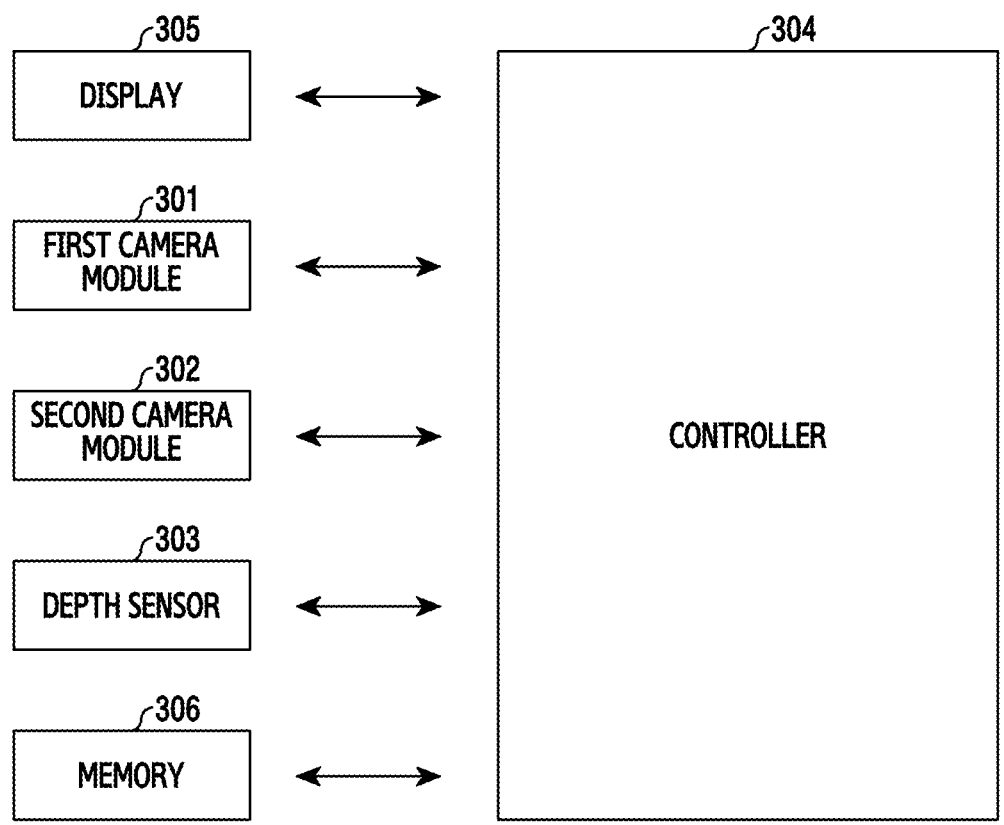
FIG. 3 is a block diagram of an example of an electronic device, according to aspects of the disclosure.

FIG. 3 is a block diagram of an example of an electronic device, according to aspects of the disclosure. According to aspects of the disclosure, the electronic device may include a first camera module 301, a second camera module 302, a depth sensor 303, a controller 304, a display 305, and a memory 306.

According to aspects of the disclosure, the first camera module 301 and the second camera module 302 may detect a subject at angles of the respective camera modules to acquire image information. According to aspects of the disclosure, the camera modules 301 and 302 may provide, to an image processor, a collection of images of a subject. According to aspects of the disclosure, the camera modules 301 and 302 may collect an image including a plurality of color pixels and provide it to at least one of the controller 304 and the image processor. According to aspects of the disclosure, the camera modules 301 and 302 may include at least one image sensor. According to aspects of the disclosure, an array camera may be included to capture an image simultaneously by several camera modules arranged therein.

According to aspects of the disclosure, the depth sensor 303 may acquire depth information of a plurality of subjects. According to aspects of the disclosure, the depth sensor 303 may include a sensor, implemented with an infrared pulse laser which operates in a time-of-flight manner, for calculating the distance to a measurement object.

According to aspects of the disclosure, the controller 304 may process the image by using image information output from the first camera module 301 and the second camera module 302 and the depth information output from the depth sensor 303. According to aspects of the disclosure, the controller 304 may receive a command from the aforementioned constitutional elements (i.e., the first camera module 301, the second camera module 302, the depth sensor 303, and the display 305) to interpret the received command and to execute an arithmetic operation or data processing based on the interpreted command.

According to aspects of the disclosure, the controller 304 may include an image processor for performing image processing of the image input from the first camera module 301 and the second camera module 302. According to aspects of the disclosure, the image processor may combine a plurality of images continuously captured through the first camera module 301 and the second camera module 302 to generate a composite image having a greater depth of field than any of the captured images.

According to aspects of the disclosure, the image processor may execute an image conversion program to combine the continuously captured plurality of images into one image. According to aspects of the disclosure, in order to compensate for a size difference of a sub-image due to a difference in an angle of view for each image, the image processor may extract a corresponding sub-image from each image up to a boundary separated by a reference interval from an outline of the in-focus sub-image, and thus combine the images into one image.

According to aspects of the disclosure, the image processor may crop at least one remaining image with respect to an image having a smallest angle of view so that the continuously captured plurality of images have the same angle of view, and thereafter may extract an in-focus sub-image from each image and combine the images into one image.

According to aspects of the disclosure, the image processor may crop at least a portion of a boundary of the at least one remaining image and thereafter may extract sub-images to be combined.

According to aspects of the disclosure, the display 305 may display a variety of information and images such as multimedia data or text data.

According to aspects of the disclosure, the memory 306 may store a command or data received from different constitutional elements (i.e., the first camera module 301, the second camera module 302, the controller 304, and the display 305) or generated from the different constitutional elements. According to aspects of the disclosure, the memory 306 may include programming modules such as a kernel, a middleware, an application programming interface, an application, and the like. The aforementioned programming modules may be configured in software, firmware, hardware, or at least two or more of combinations thereof.

Figure 4A:
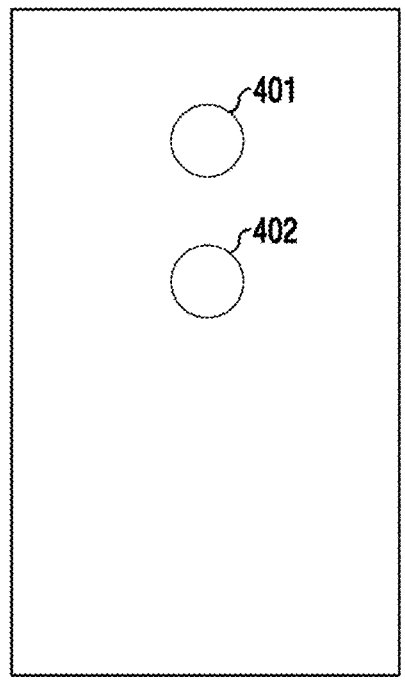
FIG. 4A, FIG. 4B, and FIG. 4C are diagrams illustrating of an example of a camera module, according to aspects of the disclosure.
Figure 4B:
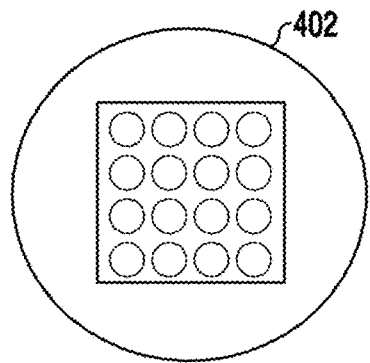
Figure 4C:
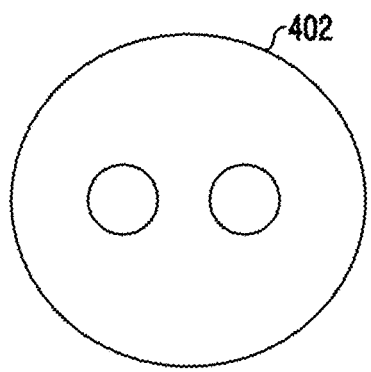

FIGS. 4A-C are diagrams illustrating an example of a camera module, according to aspects of the disclosure. According to aspects of the disclosure, the camera module may be provided as one part of an electronic device. For example, as shown in FIG. 4A, camera modules 401 and 402 may be disposed in an area defined in a rear side of the electronic device. According to aspects of the disclosure, the second camera module 402 may be referred to as a "sensing unit." According to aspects of the disclosure, the sensing unit may include a Time-Of-Flight (TOF)-type sensor for determining depth information by using time information which is input when an infrared pulse layer is emitted and is reflected from a subject. According to aspects of the disclosure, the first camera module 401 and the second camera module 402 may be disposed at a near distance, or may be positioned as far from one another as possible.

According to aspects of the disclosure, the second camera module 402 may be a plurality of array cameras. For example, as shown in FIG. 4B, the second camera module 402 may be an array camera including a plurality of cameras unlike the first camera module 401 which may include only one camera. According to aspects of the disclosure, the second camera module 402 may be used to generate depth information by using an image acquired from a plurality of cameras. According to aspects of the disclosure, the electronic device may generate at least one piece of depth information by using image information acquired from the first camera module 401 and a plurality of pieces of image information acquired from the second camera module 402.

According to aspects of the disclosure, the second camera module 402 may be a 3-Dimensional (3D) camera including at least two image sensors. For example, as shown in FIG. 4C, the second camera module 402 may be a 3D camera which can represent an image of a captured subject in a 3D manner. According to aspects of the disclosure, the second camera module 402 may generate a 3D image by using an image input from a plurality of cameras.

According to aspects of the disclosure, an electronic device may include at least two image sensors for acquiring a plurality of images, and a processor for extracting depth information of at least two subjects included in the acquired plurality of images, and for performing image processing on the subjects on the basis of the extracted depth information.

The electronic device may further include at least one camera module for acquiring the plurality of images.

The processor may calculate a distance to the subject by using at least one of an image-plane phase-difference sensor, a phase-difference sensor, a Time Of Flight (TOF) sensor, an infrared sensor, and an image sensor.

The processor may combine the acquired plurality of images, and generates a 3 Dimensional (3D) image by using the combined plurality of images.

The processor may generate a first image which is focused on a first subject located at a near distance among the subjects, generate a second image which is focused on a second subject located at a far distance among the subjects, and generate a third image which is focused on a third subject located in between the near distance and the far distance.

The electronic device may further include a display for displaying a determined image among the first image to the third image.

The processor may combine the first image, the second image, and third image to generate a composite image. The electronic device may further include a display for displaying the resultant composite image.

The electronic device may further include a display for displaying at least one image among a first image which is focused on a first subject located at a near distance, a second image which is focused on a second subject located at a far distance, a third image which is focused on a third subject located in between the near distance and the far distance, and an image obtained by combining the first image, the second image, and the third image. The processor may detect editing performed on any one of the displayed images.

The display may select any one of the first subject to the third subject included in the displayed any one image. The processor may determine a relative distance of the remaining unselected subjects with respect to the selected subject, and according to the determined distance, apply a relatively large blur to a subject at a relatively far distance, and apply a relatively small blur to a subject at a relatively near distance.

The processor may scale the extracted depth information according to a size of the acquired image.

Figure 5A:
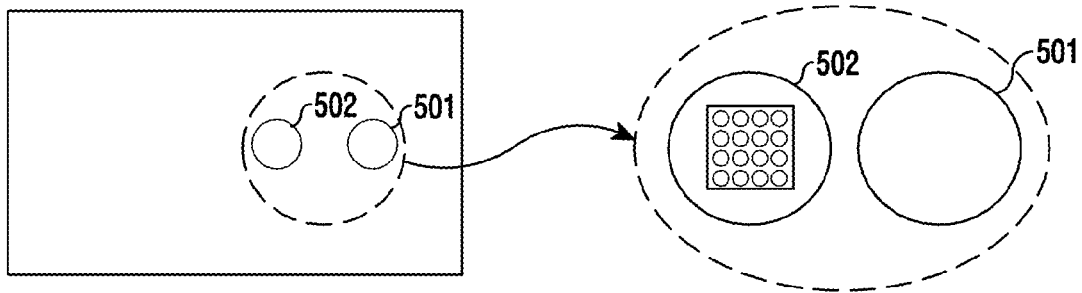
FIG. 5A, FIG. 5B, and FIG. 5C are diagrams illustrating an example of a technique for extracting depth information according to aspects of the disclosure.
Figure 5B:
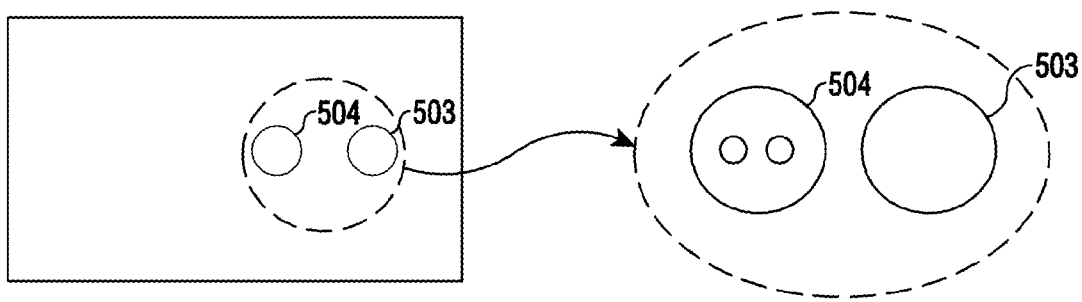
Figure 5C:
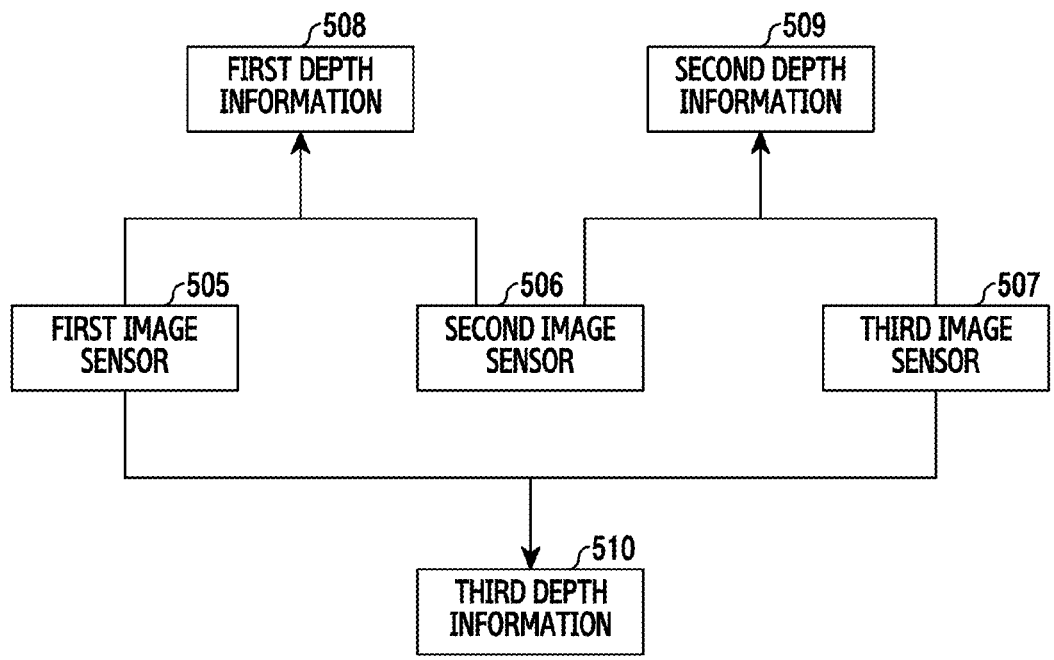

FIGS. 5A-C are diagrams illustrating an example of a technique for extracting depth information according to aspects of the disclosure. According to the technique, an electronic device may acquire a plurality of images from a camera module. For example, as shown in FIG. 5A, the electronic device may acquire a first image from a first camera module 501, and may acquire second and third images from a second camera module 502. According to aspects of the disclosure, the electronic device may acquire the first image from the first camera module 501 including one camera, and may acquire the second and third images from the second camera module 502 including an array camera.

As another example, as shown in FIG. 5B, the electronic device may acquire the first image from the first camera module 501, and may acquire the second and third images from the second camera module 502. According to aspects of the disclosure, the electronic device may acquire the first image from the first camera module 501 including one camera, and may acquire the second and third images from the second camera module 502 including two 3D cameras.

According to aspects of the disclosure, the electronic device may extract one or more pieces of depth information from a plurality of images acquired from the first camera module 501 and the second camera module 502. For example, in instances in which a first image, a second image, and a third image are respectively acquired from a first image sensor 505, a second image sensor 506, a third image sensor 507 of the electronic device, three different pieces of depth information 508, 509, and 510 may be extracted, as shown in FIG. 5C.

More precisely, the electronic device may extract first depth information 508 by using the first image acquired from the first image sensor 505 and the second image acquired from the second image sensor 506. According to aspects of the disclosure, the electronic device may extract second depth information 509 by using the second image acquired from the second image sensor 506 and the third image acquired from the third image sensor 507. According to aspects of the disclosure, the electronic device may extract third depth information 501 by using the first image acquired from the first image sensor 505 and the third image acquired from the third image sensor 507.

Figure 6C:
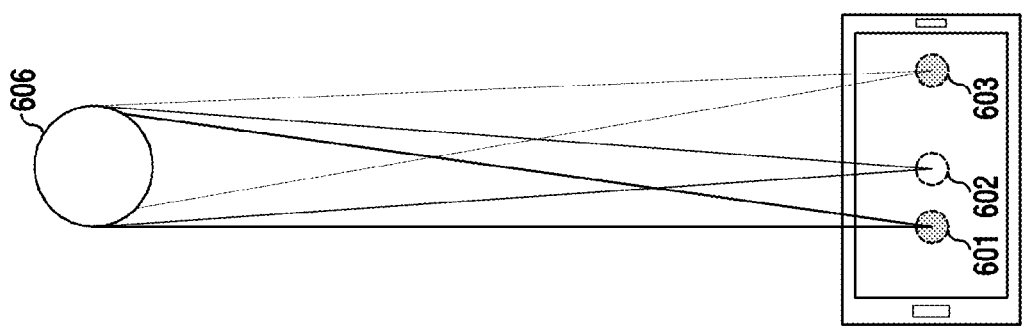
FIG. 6A, FIG. 6B, and FIG. 6C are diagrams illustrating an example of a technique for extracting depth information depending on a distance to a subject, according to aspects of the disclosure.
Figure 6B:
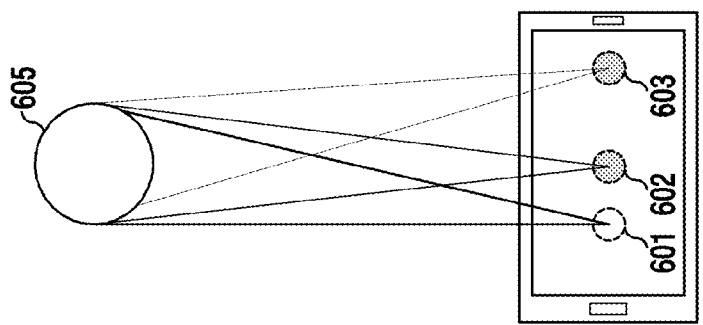
Figure 6A:
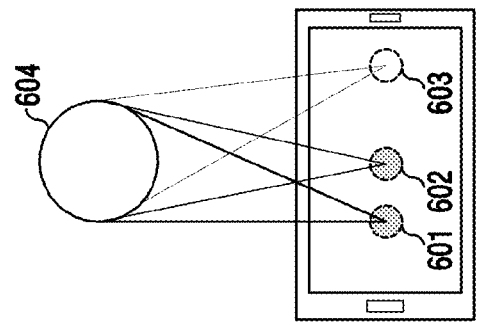

FIGS. 6A-C are diagrams illustrating an example of a technique for extracting depth information depending on a distance to a subject, according to aspects of the disclosure. In this example, the electronic device captures images of subjects 604, 605, and 606. Subject 604 is separated from the electronic device by a first distance, subject 605 is separated from the electronic device by a second distance, and subject 606 is separated from the electronic device by a third distance. The first distance is shorter than both the second distance and the third distance, and the second distance is shorter than the third distance.

According to the technique, the electronic device may acquire image information of subjects 604, 605, and 606 by using first camera modules 601 and 602 and a second camera module 603 included in the electronic device. According to aspects of the disclosure, the electronic device may acquire image information of the subjects 604, 605, and 606 by using two cameras among a first camera 601 and a second camera 602 included in the first camera modules 601 and 602 and a third camera 603 included in the second camera module.

For example, as shown in FIG. 6A, if the electronic device is to photograph the subject 604, which is separated from the electronic device by a first distance, the electronic device may acquire images of the subject 604 by using the first camera 601 and the second camera 602, and thereafter may extract first depth information by using the acquired images. According to aspects of the disclosure, depth information corresponding to the first distance may be extracted since the first camera 601 and the second camera 602 are located at the relatively short distance from one another.

As another example, as shown in FIG. 6B, if the electronic device is to photograph the subject 605, which is separated from the electronic device by the second distance, the electronic device may acquire an image of the subject 605 by using the second camera 602 and the third camera 603, which are positioned farther apart from one another than the cameras 601 and 602, and thereafter may extract depth information of the second subject by using the acquired image. According to aspects of the disclosure, depth information corresponding to the second distance may be extracted since the second camera 602 and the third camera 603 are farther apart from one another than the cameras 601 and 602.

As another example, as shown in FIG. 6C, if the electronic device is to photograph the subject 606, which is separated from the electronic device by the third distance, the electronic device may acquire images of the subject 606 by using the first camera 601 and the third camera 603. According to aspects of the disclosure, depth information corresponding to the third distance may be extracted since the first camera 601 and the third camera 603 are separated by a relatively large distance.

Figure 7:
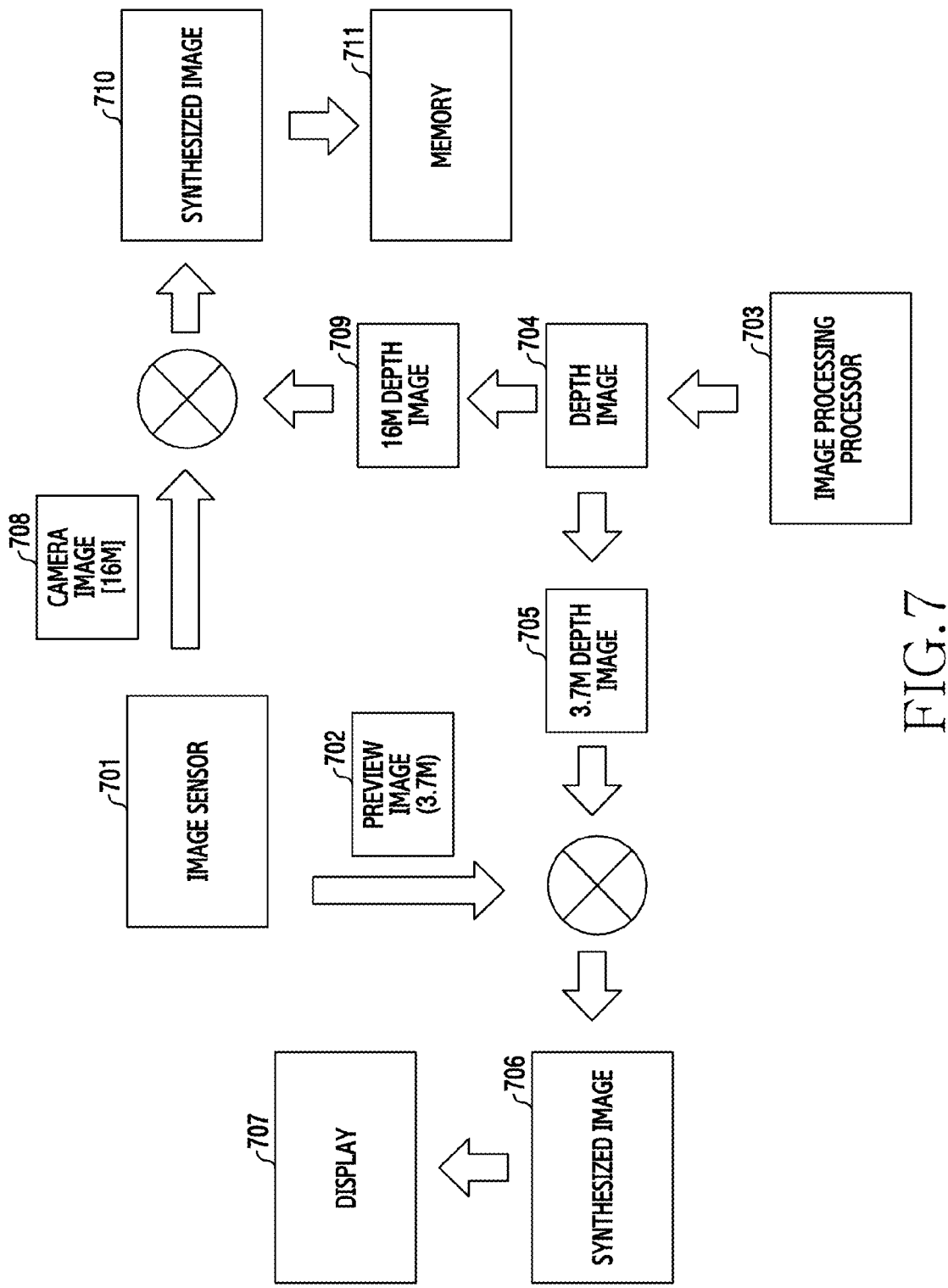
FIG. 7 is a diagram of an example of a process for storing and displaying images, according to aspects of the disclosure.

FIG. 7 is a diagram of an example of a process for storing and displaying images, according to aspects of the disclosure. According to aspects of the disclosure, an image sensor 701 may output a preview image 702 in response to user's selection. Simultaneously or sequentially, an image processor 703 may output a depth image 704 of an extracted subject.

According to aspects of the disclosure, if the electronic device intends to display the preview image 702 on a display of the electronic device, the electronic device may scale a size of the depth image 704. According to aspects of the disclosure, if the size of the preview image 702 output from the image sensor 701 is 3.7 Mega Byte (MB), the electronic device may scale the size of the depth image 704 to 3.7 MB so that a size of the depth image 704 extracted from the image processor 703 is adjusted to be equal to the size of the preview image 702.

According to aspects of the disclosure, the electronic device may combine the preview image 702 output from the image sensor 701 with a scaled depth image 705, and may present a resultant composite image 706 on a display 707.

According to aspects of the disclosure, the image sensor 701 may output a camera image 708 in response to a user's selection. Simultaneously or sequentially, the image processor 703 may output the depth image 704 of the extracted subject.

According to aspects of the disclosure, if the electronic device intends to store the output camera image 708 into a memory, the electronic device may scale the size of the depth image 704. According to one exemplary embodiment, if a size of the camera image 708 output from the image sensor 701 is 16 MB, the electronic device may scale the size of the depth image 704 to a size of 16 MB so that the size of the depth image 704 extracted from the image processor 703 is adjusted to be equal to the size of the camera image 708.

According to aspects of the disclosure, the electronic device may combine the camera image 708 output from the image sensor 701 with the scaled depth image 705 to generate a composite image 710, and may store the composite image 710 into a memory 711 of the electronic device.

FIGS. 8A-E are diagrams illustrating an example of a technique for processing an image by using extracted depth information, according to aspects of the disclosure. According to the technique, the electronic device may move a camera lens driving unit to capture images which are respectively focused on different subjects in the same scene by using the extracted depth information. According to one exemplary embodiment, if a relative distance of a sub-image for continuous capturing is estimated by using the extracted depth information, one or more images which are focused on different subjects may be acquired by adjusting the focal length of a lens on the basis of the distance between the electronic device and each of the subjects.

Figure 8B:
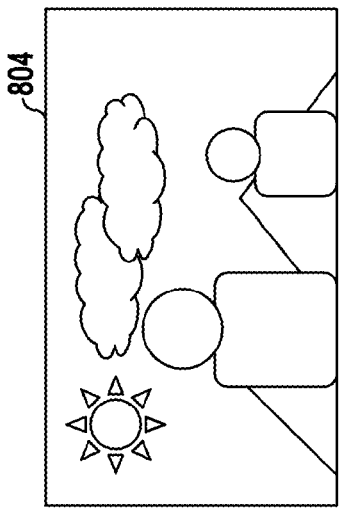
FIG. 8A, FIG. 8B, FIG. 8C, FIG. 8D and FIG. 8E are diagrams illustrating an example of a technique for processing an image by using extracted depth information, according to aspects of the disclosure.
Figure 8A:
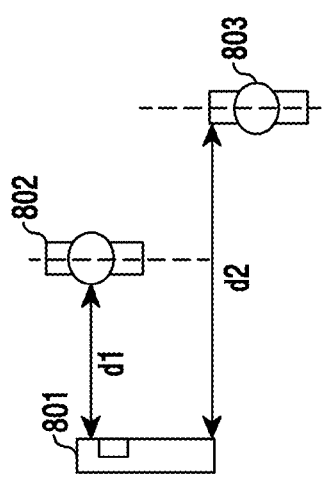

For example, a first subject 802 and a second subject 803 may be located at a distance d1 and a distance d2 respectively from an electronic device 801, as shown in FIG. 8A. In the above example, the electronic device 801 may capture sub-images which are each focused on the first subject 802 and the second subject 803, respectively. In addition, the electronic device 801 may capture a sub-image which is focused on a background that is behind the subjects 802 and 803.

Figure 8E:
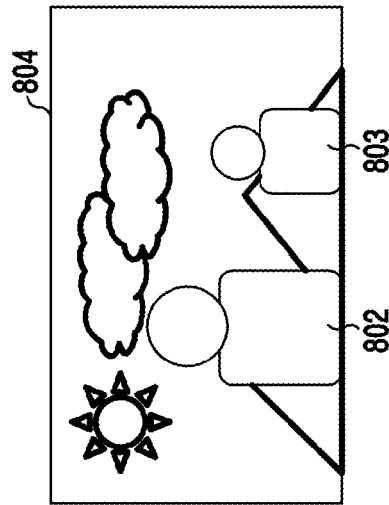
Figure 8D:
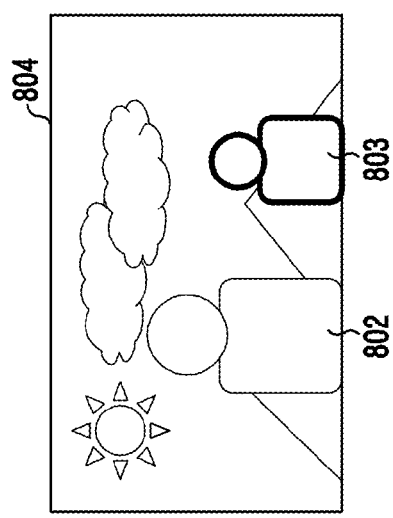
Figure 8C:
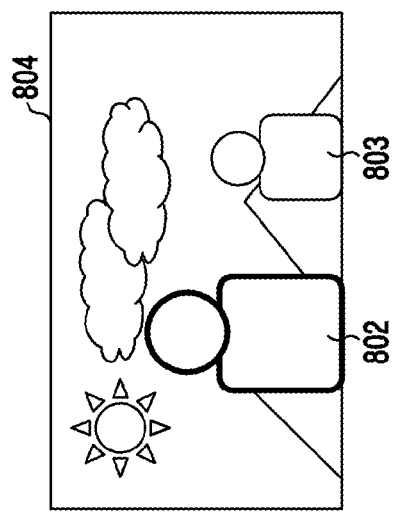
Figure 9A:
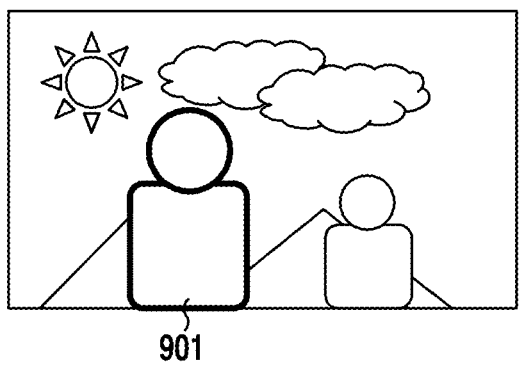
FIG. 9A, FIG. 9B, FIG. 9C, and FIG. 9D are diagrams illustrating an example of a technique for combining images including different focus information according to aspects of the disclosure.
Figure 9B:
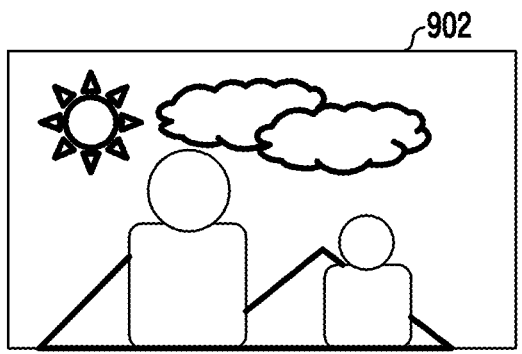
Figure 9C:
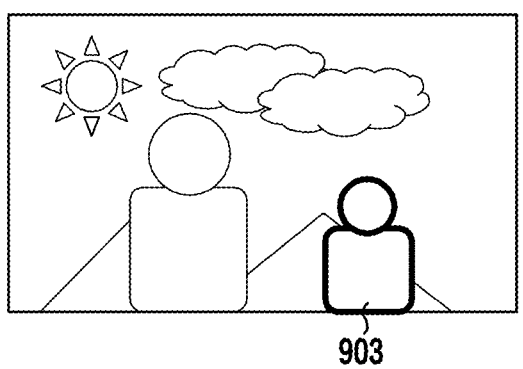
Figure 9D:
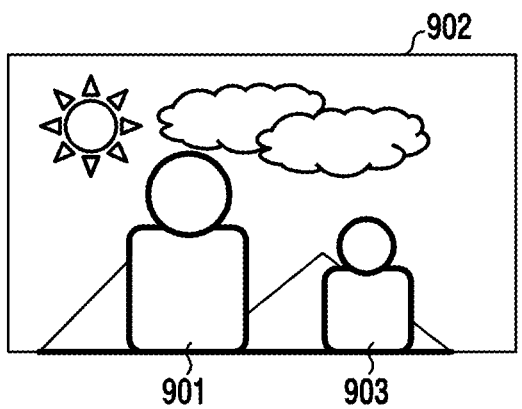

According to aspects of the disclosure, if the electronic device captures sub-images which are focused on the respective subjects and the background, each sub-image's respective in-focus portion/subject may appear more sharply than other portions of the image. For example, as shown in FIGS. 8A and 8C, if the electronic device 801 captures a sub-image which is focused on the first subject 802 located at the distance d1 from the electronic device 801, the second subject 803 and a background 804 may appear blurry, in that sub-image, in comparison to the first subject 802. As another example, as shown in FIGS. 8A and 8D, if the electronic device 801 captures a sub-image which is focused on the second subject 803 located at the distance d2 from the electronic device 801, the first subject 802 and the background 804 may appear blurry, in that sub-image, in comparison the second subject 803. As yet another example, as shown in FIGS. 8A and 8E, if the electronic device 801 captures a sub-image which is focused on the background 804 located at the farthest distance from the electronic device 801, the first subject 802 and the second subject 803 may appear blurry, in that image, in comparison to the background 804.

According to aspects of the disclosure, the electronic device may combine the respective sub-images captured to generate a composite image. For example, as shown in FIGS. 8A and 8B, if the electronic device 801 captures sub-images which are focused respectively on the first subject 802, the second subject 803, and the background image 804, the electronic device 801 may combine the respective sub-images into one image.

FIGS. 9A-D are diagrams illustrating an example of a technique for combining images including different focus information, according to aspects of the disclosure. According to the technique, an electronic device may detect whether an event for image generation occurs. According to aspects of the disclosure, the electronic device may detect whether an event for image generation occurs on the basis of detected input information through an input module. For example, the electronic device may detect whether a command for combining captured sub-images is input through the input module.

According to aspects of the disclosure, the electronic device may detect whether a user's gesture corresponding to the event for image generation is detected. For example, the electronic device may perform the image generation in response to detecting a predetermined input gesture, such as a touch input, a drag, and/or any other suitable type of gesture.

According to aspects of the disclosure, upon detection of a plurality of out-of-focus images, the electronic device may automatically recognize this as the event for image generation. For example, if the electronic device detects sub-images which are focused respectively on a first subject, a second subject, and a background, the electronic device may automatically recognize this as the event for image generation and in response it may combine the respective sub-images to generate a composite image.

According to the aforementioned examples, the electronic device may detect whether the event for generating a composite image occurs. For example, as shown in FIGS. 9A to D, if the electronic device may capture sub-images by focusing respectively on a first subject 901, a background 902, and a second subject 903 and thereafter detects an event for combining the sub-images 901, 902, and 903, the electronic device may generate a composite image by combining the sub-images 901, 902, and 903. For example, and without limitation, the electronic device may use any suitable type of focus-stacking algorithm to combine the sub-images 901, 902, and 903.

Figure 10A:
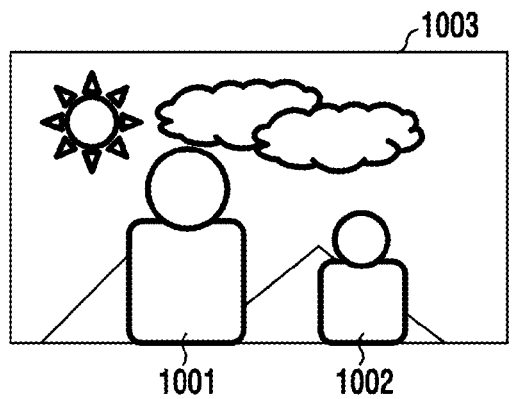
FIG. 10A, FIG. 10B, and FIG. 10C are diagrams illustrating an example of a technique for editing an image according to aspects of the disclosure.
Figure 10B:
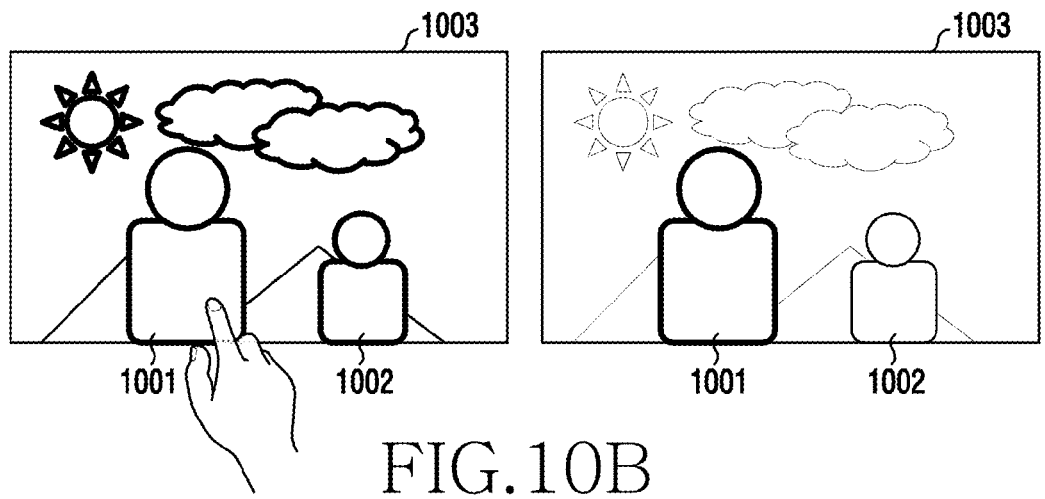
Figure 10C:
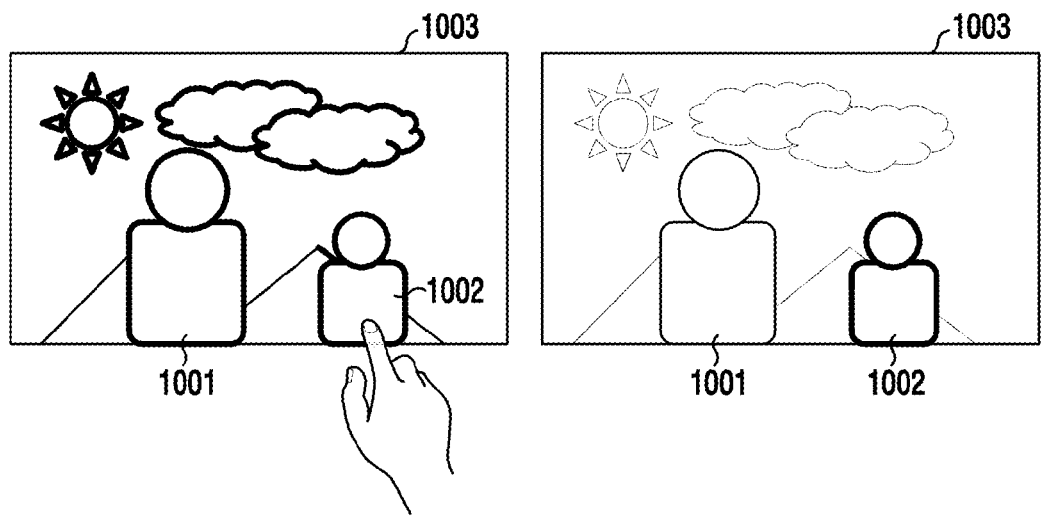

FIGS. 10A-C are diagrams illustrating an example of a technique for editing an image, according to aspects of the disclosure. According to aspects of the disclosure, upon detection of an event for combining sub-images captured in the electronic device, the electronic device may combine the plurality of sub-images to produce a composite image. For example, as shown in FIG. 10A, the electronic device may combine a first image which is focused on a first subject 1001, a second image which is focused on a second subject 1002, and a third image which is focused on a background to produce a composite image.

For example, as shown in FIGS. 10B and C, after displaying a composite image which is obtained by combining the first subject 1001, the second subject 1002, and the background 1003, the electronic device may edit the composite image in response to a user's selection. Hereinafter, in instances in which the first subject 1001, the second subject 1002, and the background 1003 are located starting from the nearest distance from the electronic device is taken for example in the following description.

According to aspects of the disclosure, if the electronic device displays a composite image depicting the subjects 1001, 1002, and 1003, and thereafter detects a user input selecting the first subject 1001, the electronic device may determine a relative distance of the non-selected remaining subjects 1002 and 1003 with respect to the selected first subject 1001. Afterwards, depending on the determined distance, the electronic device may apply a relatively large blur to the background 1003 located at a relatively far distance, and may apply a relatively small blur to the second subject 1002 located at a relatively near distance. In other words, the extent to which each of the subjects 1002 and 1003 is blurred may be based on the distance of that subject to the selected subject 1001.

According to one exemplary embodiment, if the electronic device displays a composite image depicting the subjects 1001, 1002, and 1003, and thereafter detects a user input that selects the second subject 1002, the electronic device may determine a relative distance of the non-selected remaining subjects 1001 and 1003 with respect to the selected second subject 1002. According to one exemplary embodiment, depending on the determined distance, the electronic device may apply a relatively large blur to the background 1003 located at a relatively far distance, and may apply a relatively small blur to the first subject 1001 located at a relatively near distance.

Figure 11:
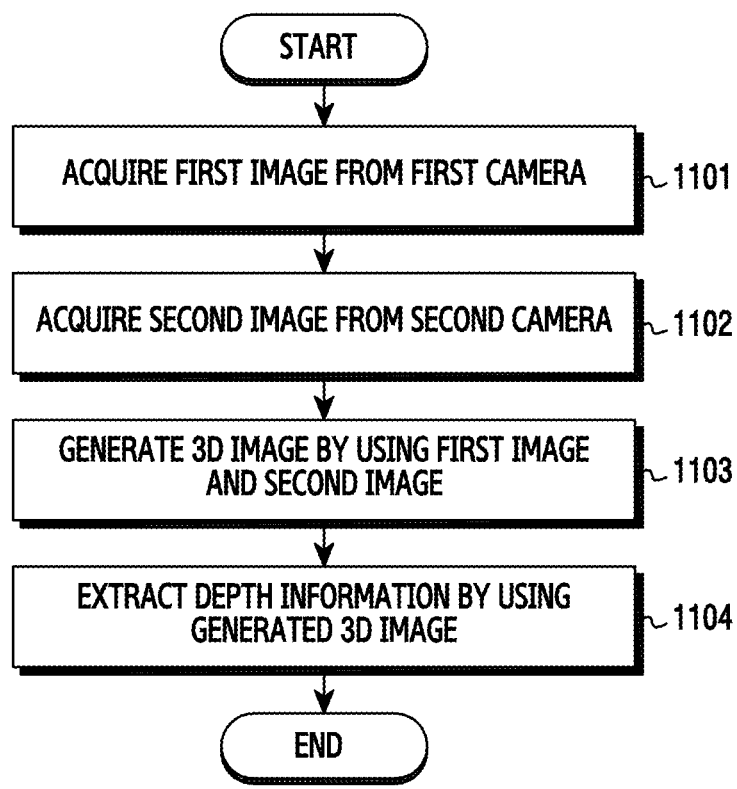
FIG. 11 is a flowchart of an example of a process, according to aspects of the disclosure.

FIG. 11 is a flowchart of an example of a process, according to aspects of the disclosure. As shown in FIG. 11, in operation 1101, the electronic device may acquire a first image from a first camera. According to aspects of the disclosure, the electronic device may acquire the first image collected from the first camera among a plurality of cameras disposed at predetermined locations of the electronic device.

In operation 1102, the electronic device may acquire a second image from a second camera. According to aspects of the disclosure, the electronic device may acquire the second image collected from the second camera among the plurality of cameras disposed at predetermined locations of the electronic device.

In operation 1103, the electronic device may generate a 3D image by using the first image and the second image. According to aspects of the disclosure, the electronic device may generate the 3D image by combining the first and second images acquired from the first and second cameras.

In operation 1104, the electronic device may extract depth information by using the generated 3D image. For example, the electronic device may use the generated 3D image to extract depth information indicating that the first subject is located at a first distance from the electronic device, the third subject is located at a third distance from the electronic device, and the second subject is located at a second distance from the electronic device, wherein the first distance is smaller than the second distance, and the second distance is smaller than the third distance. According to aspects of the disclosure, the electronic device may calculate a distance to a subject by using at least one of an image-plane phase-difference sensor, a phase-difference sensor, a Time Of Flight (TOF) sensor, an infrared sensor, and an image sensor.

Figure 12:
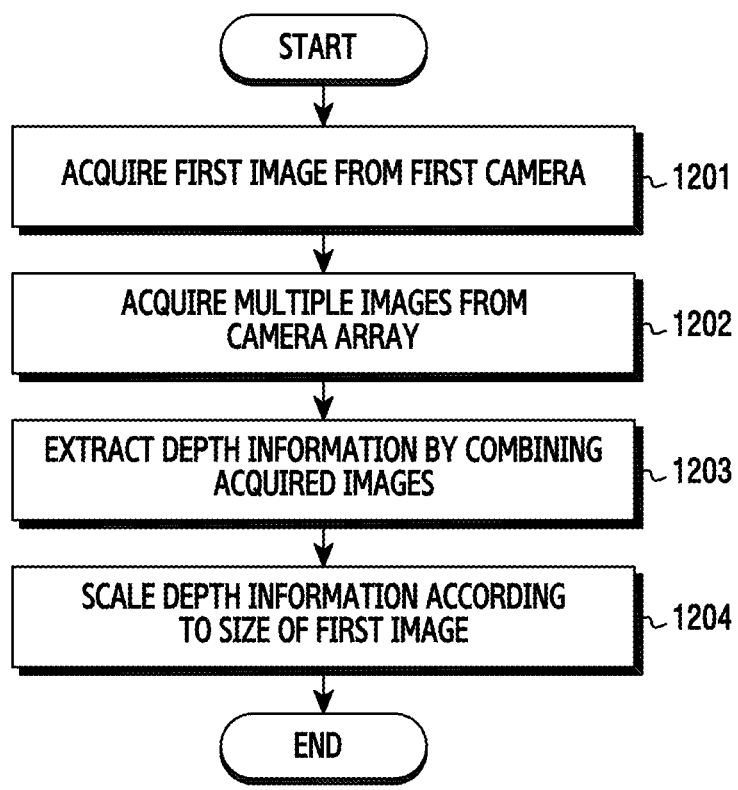
FIG. 12 is a flowchart of an example of a process, according to aspects of the disclosure.

FIG. 12 is a flowchart of an example of a process, according to aspects of the disclosure. As shown in FIG. 12, in an operation 1201, the electronic device may acquire a first image from a first camera. According to aspects of the disclosure, the electronic device may acquire the first image collected from the first camera among a plurality of cameras disposed at predetermined locations of the electronic device.

In operation 1202, the electronic device may acquire a plurality of images from an array camera. According to aspects of the disclosure, the electronic device may acquire a plurality of images from the array camera for performing a function of a second camera disposed at a predetermined location of the electronic device.

In operation 1203, the electronic device may extract depth information by combining the acquired image. According to aspects of the disclosure, the electronic device may combine the acquired image, and may extract the depth information by using other included sensors. For example, the electronic device may calculate a distance to a subject by using at least one of the image acquired from the electronic device and an image-plane phase-difference sensor, a phase-difference sensor, a TOF sensor, an infrared sensor, and an image sensor.

In operation 1204, the electronic device may scale the depth information according to a size of the first image. According to aspects of the disclosure, if the electronic device intends to display a preview image to a display of the electronic device, the electronic device may scale the depth information according to the size of the first image. According to aspects of the disclosure, if it is intended to combine a camera image output from an image sensor of the electronic device with the scaled depth image and to store the resultant composite image into a memory of the electronic device, the electronic device may scale the depth information according to the size of the first image.

Figure 13:
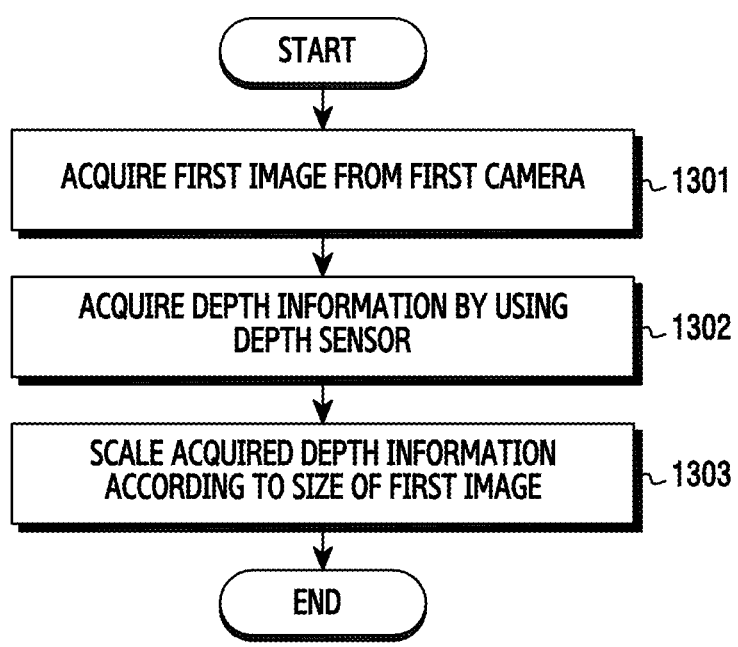
FIG. 13 is a flowchart of an example of a process, according to aspects of the disclosure.

FIG. 13 is a flowchart of an example of a process, according to aspects of the disclosure. As shown in FIG. 13, in an operation 1301, the electronic device may acquire a first image from a first camera. According to aspects of the disclosure, the electronic device may acquire the first image collected from the first camera among a plurality of cameras disposed at predetermined locations of the electronic device.

In operation 1302, the electronic device may acquire depth information by using a depth sensor. According to aspects of the disclosure, the electronic device may acquire the depth information by using the depth sensor such as an image-plane phase-difference sensor, a phase-difference sensor, a TOF sensor, an infrared sensor, and an image sensor.

In operation 1303, the electronic device may scale the acquired depth information according to a size of the first image. According to aspects of the disclosure, if the electronic device intends to display a preview image to a display of the electronic device, the electronic device may scale the depth information according to the size of the first image. According to aspects of the disclosure, if it is intended to combine a camera image output from an image sensor of the electronic device with the scaled depth image and to store the resultant composite image into a memory of the electronic device, the electronic device may scale the depth information according to the size of the first image.

Figure 14:
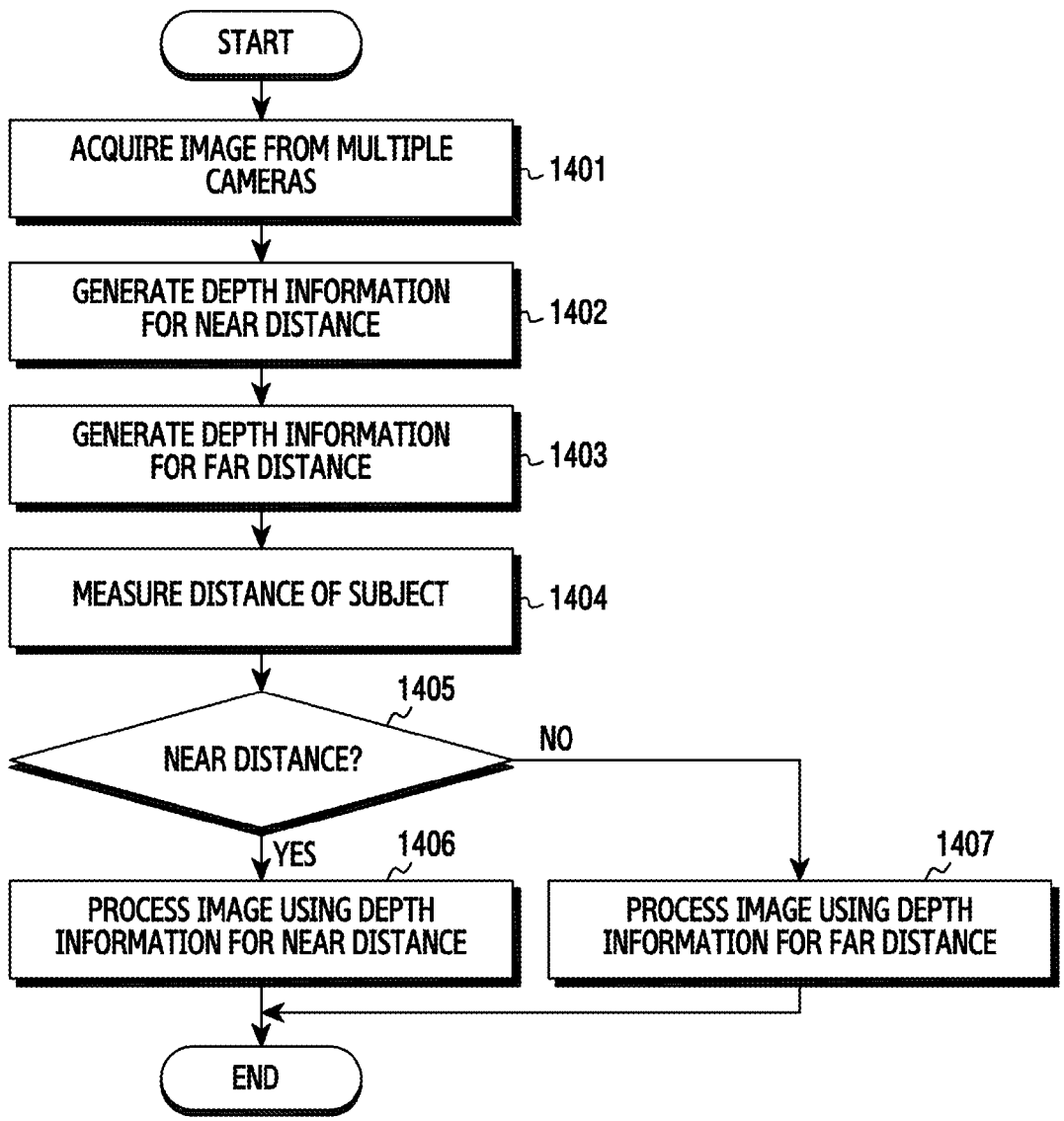
FIG. 14 is a flowchart of an example of a process, according to aspects of the disclosure.

FIG. 14 is a flowchart of an example of a process, according to aspects of the disclosure. As shown in FIG. 14, in an operation 1401, the electronic device may acquire an image from a plurality of cameras. According to aspects of the disclosure, the electronic device may acquire first and second images collected from first and second cameras which are the plurality of cameras disposed at predetermined locations of the electronic device.

In operation 1402, the electronic device may generate depth information for a near distance. According to aspects of the disclosure, the electronic device may generate depth information for the near distance by using the acquired plurality of images.

In operation 1403, the electronic device may generate depth information for a far distance. According to aspects of the disclosure, the electronic device may generate the depth information for the far distance by using the acquired plurality of images.

In operation 1404, the electronic device may measure a distance of a subject. According to aspects of the disclosure, the electronic device may measure a relative distance to the subject by using a depth sensor, image sensor, phase-difference sensor, image-plane phase-difference sensor, or the like included in the electronic device.

In operation 1405, the electronic device may determine whether the subject is located at the near distance.

In operation 1406, if the electronic device determines that the subject is located at the near distance, the electronic device may process an image by using the depth information for the near distance.

In operation 1407, if the electronic device determines that the subject is located at the far distance, the electronic device may process the image by using the depth information for the far distance.

Figure 15:
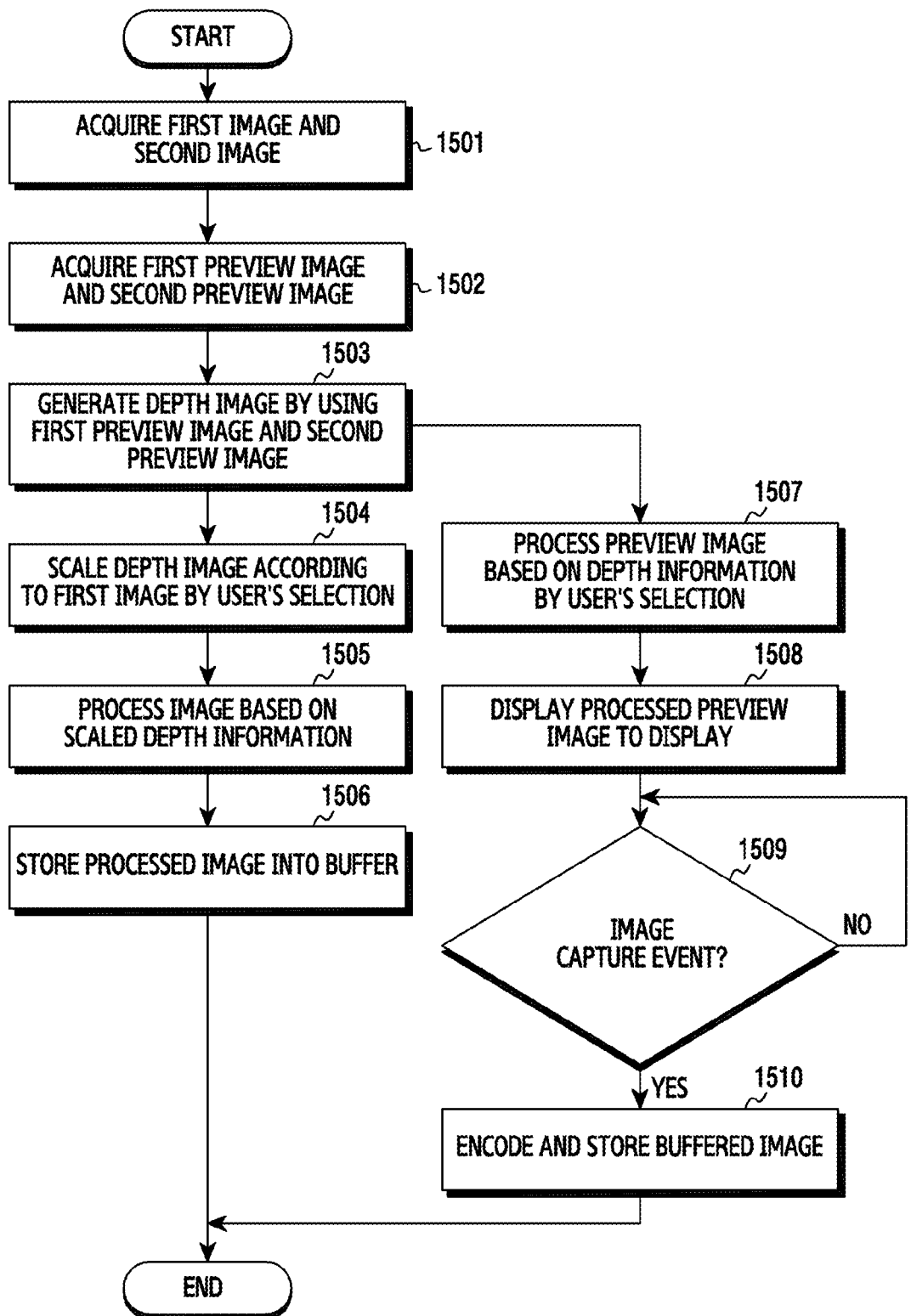
FIG. 15 is a flowchart of an example of a process, according to aspects of the disclosure.

FIG. 15 is a flowchart of an example of a process, according to aspects of the disclosure. As shown in FIG. 15, in an operation 1501, the electronic device may acquire a first image and a second image. According to aspects of the disclosure, the electronic device may acquire first and second images collected from first and second cameras which are the plurality of cameras disposed at predetermined locations in the electronic device.

In operation 1502, the electronic device may acquire a first preview image and a second preview image. According to aspects of the disclosure, an image sensor of the electronic device may output the preview image by a user's selection.

In operation 1503, the electronic device may generate depth image by using the first preview image and the second preview image. According to aspects of the disclosure, an image processing processor of the electronic device may output a depth image of an extracted subject.

In operation 1504, the electronic device may scale the depth image according to the first image by a user's selection. According to aspects of the disclosure, if the size of first image output from the image sensor of the electronic device is 3.7 MB, the electronic device may scale the size of the depth image to 3.7 MB so that a size of a depth image extracted from the image processing processor is adjusted to be equal to the size of the first image.

In operation 1505, the electronic device may process an image on the basis of the scaled depth information. According to aspects of the disclosure, the electronic device may combine sub-images into one image.

In operation 1506, the electronic device may store the processed image into a buffer.

In operation 1507, the electronic device may process a preview image on the basis of the depth information by a user's selection.

In operation 1508, the electronic device may output the processed preview image on a display.

In operation 1509, the electronic device may detect an image capture event.

In operation 1510, the electronic device may encode and store the buffered image in a memory, in response to the image capture event.

Figure 16:
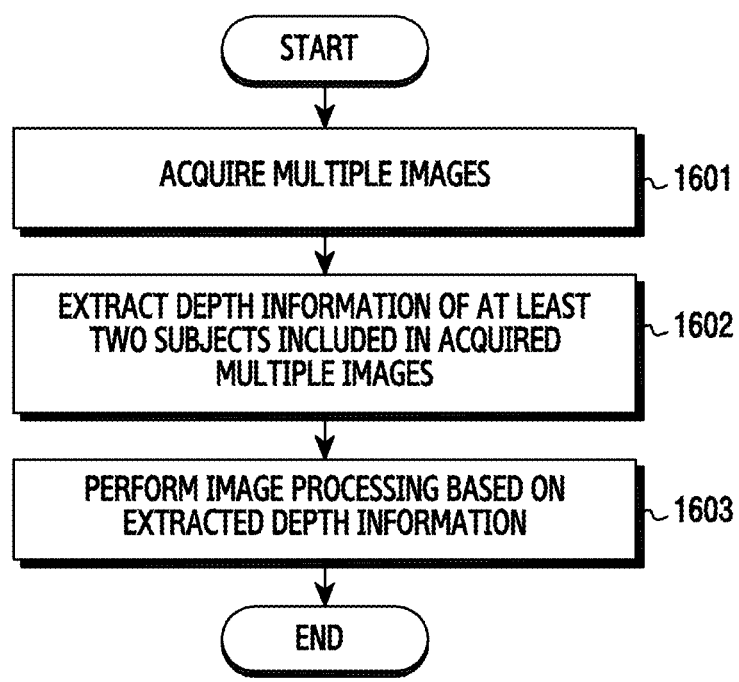
FIG. 16 is a flowchart of an example of a process, according to aspects of the disclosure.

FIG. 16 is a flowchart of an example of a process, according to aspects of the disclosure. As shown in FIG. 16, in an operation 1601, the electronic device may acquire a plurality of images. According to aspects of the disclosure, the electronic device may acquire first and second images collected from first and second cameras which are the plurality of cameras disposed at predetermined locations of the electronic device. According to aspects of the disclosure, the aforementioned camera may include an array camera.

In operation 1602, the electronic device may extract depth information of at least two subjects included in the acquired plurality of images. According to aspects of the disclosure, the electronic device may combine the acquired image, and may extract the depth information by using other included sensors. For example, the electronic device may calculate a distance to a subject by using at least one of the image acquired from the electronic device and an image-plane phase-difference sensor, a phase-difference sensor, a TOF sensor, an infrared sensor, and an image sensor.

In operation 1603, the electronic device may perform image processing on the basis of the extracted depth information. For example, in instances in which the first subject, the second subject, and the background are located starting from the nearest distance from the electronic device is taken for example in the following description. According to aspects of the disclosure, if the electronic device displays an image and thereafter receives a selection of the second subject from a user, the electronic device may determine a relative distance of the non-selected remaining subjects to the selected second subject. According to aspects of the disclosure, depending on the determined distance, the electronic device may apply a relatively large blur to the background when the objects in the background are located at a relatively large distance, and may apply a relatively small blur to the second subject when the second subject is located at a relatively small distance.

According to aspects of the disclosure, a method of operating an electronic device may include acquiring a plurality of images, extracting depth information of at least two subjects included in the acquired plurality of images, and performing image processing on the subjects on the basis of the extracted depth information.

The acquiring of the plurality of images may be performed using at least two image sensors.

The method may further include calculating a distance to the subject by using at least one of an image-plane phase-difference sensor, a phase-difference sensor, a Time Of Flight (TOF) sensor, an infrared sensor, and an image sensor.

The extracting of the depth information may include combining the acquired plurality of images, and generating a 3 Dimensional (3D) image by using the combined plurality of images.

The performing of the image processing on the subject may include generating a first image which is focused on a first subject located at a near distance among the subjects, generating a second image which is focused on a second subject located at a far distance among the subjects, and generating a third image which is focused on a third subject located in between the near distance and the far distance.

The method may further include displaying a determined image among the first image to the third image.

The method may further include combining the first image, the second image, and the third image, and displaying the resultant composite image.

The method may further include displaying at least one image among a first image which is focused on a first subject located at a near distance, a second image which is focused on a second subject located at a far distance, a third image which is focused on a third subject located in between the near distance and the far distance, and an image obtained by combining the first image, the second image, and the third image, and detecting editing performed on any one of the displayed images.

The detecting of the editing may include selecting any one of the first subject to the third subject included in the displayed any one image, determining a relative distance of the remaining unselected subjects with respect to the selected subject, and according to the determined distance, applying a relatively large blur to a subject at a relatively far distance, and applying a relatively small blur to a subject at a relatively near distance.

The method may further include scaling the extracted depth information according to a size of the acquired image.

FIGS. 1-16 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method implemented by an electronic device, the method comprising:
   obtaining first depth information based on a first image obtained from a first image sensor and a second image obtained from a second image sensor;
   obtaining second depth information based on the second image obtained from the second image sensor and a third image obtained from a third image sensor;
   determining a distance between the electronic device and a subject included in at least one image among the first image, the second image and the third image;
   selecting one of the first depth information and the second depth information based on the distance; and
   generating a final image having the subjects based on the selected depth information.

2. The method of claim 1, wherein at least two of the first image sensor, the second image sensor, and the third image sensor are comprised in an array camera of the electronic device.

3. The method of claim 1, wherein determining a distance comprises determining the distance between the electronic device and the subject by using at least one of an image-plane phase-difference sensor, a phase-difference sensor, a Time Of Flight (TOF) sensor, an infrared sensor, and an image sensor.

4. The method of claim 1, wherein generating the final image comprises:
   Obtaining a first sub image that is focused on a first subject, the first subject being separate from the electronic device by a first distance; and
   obtaining a second sub image that is focused on a second subject, the second subject being separated from the electronic device by a second distance
   wherein the first sub image and the second sub image are generated based on the selected depth information.

5. The method of claim 4, further comprising displaying a selected one of the first sub image and the second sub image.

6. The method of claim 4, further comprising:
   generating the final image by combining the first sub image and the second image.

7. The method of claim 5, further comprising:
   detecting editing performed on one of the displayed images.

8. The method of claim 7, wherein detecting of the editing comprises:
   determining a relative distance of each of the first subject and the second subject; and
   according to the determined distance, applying a relatively large blurring effect to a subject at a relatively far distance, and applying a relatively small blurring effect to a subject at relatively near distance.

9. The method of claim 1, further comprising scaling one of the first depth information and second depth information based on a size of one of the first image, the second image, and the third image.

10. An electronic device comprising:
    a first image sensor;
    a second image sensor;
    a third image sensor; and
    a processor configured to:
    obtain first depth information based on a first image obtained from the first image sensor and a second image obtained from the second image sensor,
    obtain second depth information based on the second image obtained from the second image sensor and a third image obtained from the third image sensor,
    determine a distance between the electronic device and a subject included in at least one image among the first image, the second image and the third image,
    select one of the first depth information and the second depth information based on the distance, and
    generate a final image having the subjects based on the selected depth information.

11. The electronic device of claim 10, further comprising:
    an array camera comprising at least two of the first image sensor, the second image sensor, and the third image sensor.

12. The electronic device of claim 10, wherein the processor is configured to determine the distance between the electronic device and the subject by using at least one of an image-plane phase-difference sensor, a phase-difference sensor, a Time Of Flight (TOF) sensor, an infrared sensor, and an image sensor.

13. The electronic device of claim 10, wherein the processor is configured to:
    obtain a first sub image that is focused on a first subject, the first subject being separate from the electronic device by a first distance; and
    obtain a second sub image that is focused on a second subject, the second subject being separated from the electronic device by a second distance;
    wherein the first sub image, and the second sub image are obtained based on the selected depth information.

14. The electronic device of claim 13, further comprising a display for displaying a selected one of the first sub image and the second sub image.

15. The electronic device of claim 13, wherein the processor is configured to generate the final image by combining the first sub image and the second sub image.

16. The electronic device of claim 14,
    wherein the processor is further configured to detect editing performed on the displayed image.

17. The electronic device of claim 16, wherein the processor is configured to:

determine a relative distance of each of the first subject and the second subject; and according to the determined distance, apply a relatively large blurring effect to a subject at a relatively far distance, and applying a relatively small blurring effect to a subject at relatively near distance.

18. The electronic device of claim 10, wherein the processor is further configured to scale one of the first depth information and second depth information based on a size of one of the first image, the second image, and the third image.

19. The method of claim 4, further comprising:
combining the first sub image and the second sub image to generate a 3-dimensional (3D) image.

20. The electronic device of claim 13,
wherein the processor is configured to combine the first sub image and the second sub image to generate a 3-dimensional (3D).

* * * * *